US009725175B2

United States Patent
Shirey et al.

(10) Patent No.: US 9,725,175 B2
(45) Date of Patent: Aug. 8, 2017

(54) COUPLING DEVICE FOR PASSENGER SEATS

(71) Applicant: Zodiac Seats US LLC, Gainesville, TX (US)

(72) Inventors: Allen L. Shirey, Whitesboro, TX (US); Justin K. Murnan, Whitesboro, TX (US); Bob A. Halcombe, Sanger, TX (US)

(73) Assignee: Zodiac Seats US LLC, Gainesville, TX (US)

( * ) Notice: Subject to any disclaimer, the term of this patent is extended or adjusted under 35 U.S.C. 154(b) by 84 days.

(21) Appl. No.: 14/442,352

(22) PCT Filed: Nov. 12, 2013

(86) PCT No.: PCT/US2013/069532
§ 371 (c)(1),
(2) Date: May 12, 2015

(87) PCT Pub. No.: WO2014/075032
PCT Pub. Date: May 15, 2014

(65) Prior Publication Data
US 2016/0272325 A1 Sep. 22, 2016

Related U.S. Application Data

(60) Provisional application No. 61/725,166, filed on Nov. 12, 2012.

(51) Int. Cl.
*B64D 11/06* (2006.01)
*B60N 2/68* (2006.01)
(Continued)

(52) U.S. Cl.
CPC .......... *B64D 11/0627* (2014.12); *B60N 2/305* (2013.01); *B60N 2/44* (2013.01);
(Continued)

(58) Field of Classification Search
CPC ...... B60N 2/682; B60N 2/3047; B60N 2/305; B60N 2/44; B64D 11/0627; B64D 11/06; B64D 11/0015
(Continued)

(56) References Cited

U.S. PATENT DOCUMENTS 5,558,386 A * 9/1996 Tilly ...................... B60N 2/305
292/111
7,021,705 B1 * 4/2006 Niermeyer ............... A47D 1/02
297/335

(Continued)

OTHER PUBLICATIONS

International Patent Application No. PCT/US2013/069532, International Search Report and Written Opinion dated Mar. 4, 2014.

*Primary Examiner* — Milton Nelson, Jr.
(74) *Attorney, Agent, or Firm* — Kilpatrick Townsend & Stockton LLP; Dean W. Russell; Davidson G. Lucas (57) ABSTRACT

Described are passenger seats with a seat pan (12) releasably coupled to a seat frame (14) via at least one coupling device (20), which includes a ramp (22) mounted on a lower surface (36) of the seat pan (12) and a latch (42) pivotally coupled to an open end of the ramp (22). The latch (42) includes a flap configured to substantially cover the open end of the ramp (22) when the latch (42) is in a closed position, and a handle (48) that is accessible from an upper surface of the seat pan (12) via an aperture (50) in the seat pan (12). The coupling device also includes a spring (44) configured to position the latch (42) in the closed position until a force is applied to the handle (48) to rotate the latch (42) to an open position.

20 Claims, 7 Drawing Sheets (51) Int. Cl.
*B60N 2/44* (2006.01)
*B60N 2/30* (2006.01)
*B64D 11/00* (2006.01)

(52) U.S. Cl.
CPC .............. *B60N 2/682* (2013.01); *B64D 11/06* (2013.01); *B64D 11/0015* (2013.01)

(58) Field of Classification Search
USPC ...................................... 297/336, 188.1, 335
See application file for complete search history.

(56) References Cited

U.S. PATENT DOCUMENTS 7,926,873 B2    4/2011  Rombouts
8,616,631 B2 * 12/2013  Westerink ................ B60N 2/24
                                                    297/188.08

* cited by examiner

FIG. 6

COUPLING DEVICE FOR PASSENGER SEATS

CROSS REFERENCE TO RELATED APPLICATIONS

This application is the U.S. national phase entry of International Application Serial No. PCT/US2013/069532 ("the '532 application"), filed on Nov. 12, 2013, which application is related to and claims priority benefits from U.S. Provisional Application Ser. No. 61/725,166 ("the '166 application"), filed on Nov. 12, 2012, entitled RAMP WITH LATCH. The '532 and '166 applications are hereby incorporated in their entireties by this reference.

FIELD OF THE INVENTION

The field of the invention relates to passenger seats or the like and more particularly to coupling devices to releasably secure portions of the passenger seat to a seat frame.

BACKGROUND

Common carriers, such as passenger airlines, bus lines, and train lines, frequently provide an assortment of personal electronic and entertainment options accessible and entertainment options accessible from the passenger seat. For example, to improve cabin service and make the flight more enjoyable, airlines may provide video and audio entertainment, including television, video games, internet access, and other in-flight entertainment ("IFE") components. These amenities permit passengers to work, communicate, or be entertained during the flight without leaving the comfort of their seat.

Passenger IFE systems such as seat mounted flat screen video monitors and credit card activated cellular telephones are now most often mounted in the seat backs and arm rests of passenger aircraft. Some airlines also distribute personal DVD/CD players with a choice of movies/music. Passengers may even carry their own laptop computers or DVD/CD players and request power outlets. Within the confines of compact passenger seats fitted with conventional food service trays and arm rests, available space is often limited. In certain cases, the IFE equipment is fitted within the passenger seat itself. Thus, for IFE equipment such as a seat mounted display, the electrical wiring, components, processor unit, etc. is stored within an IFE box 18. The IFE box 18 is typically mounted on the side of the seat frame leg structure, thus inhibiting leg room, storage space under the passenger seat, and exposing the IFE components to debris and liquids.

Current seat design, specifically the seat pan, prohibits or limits airline technicians' access to the IFE boxes 18 when service is required and the technicians are forced to crawl on the floor of the aircraft (or possibly even remove one or more seats) in order to properly access and service the IFE boxes 18. This inconvenience greatly increases repair time and reduces accuracy, and often times requires a repair to be performed on an particular IFE box 18 multiple times until the issue is properly resolved.

Figure 1:
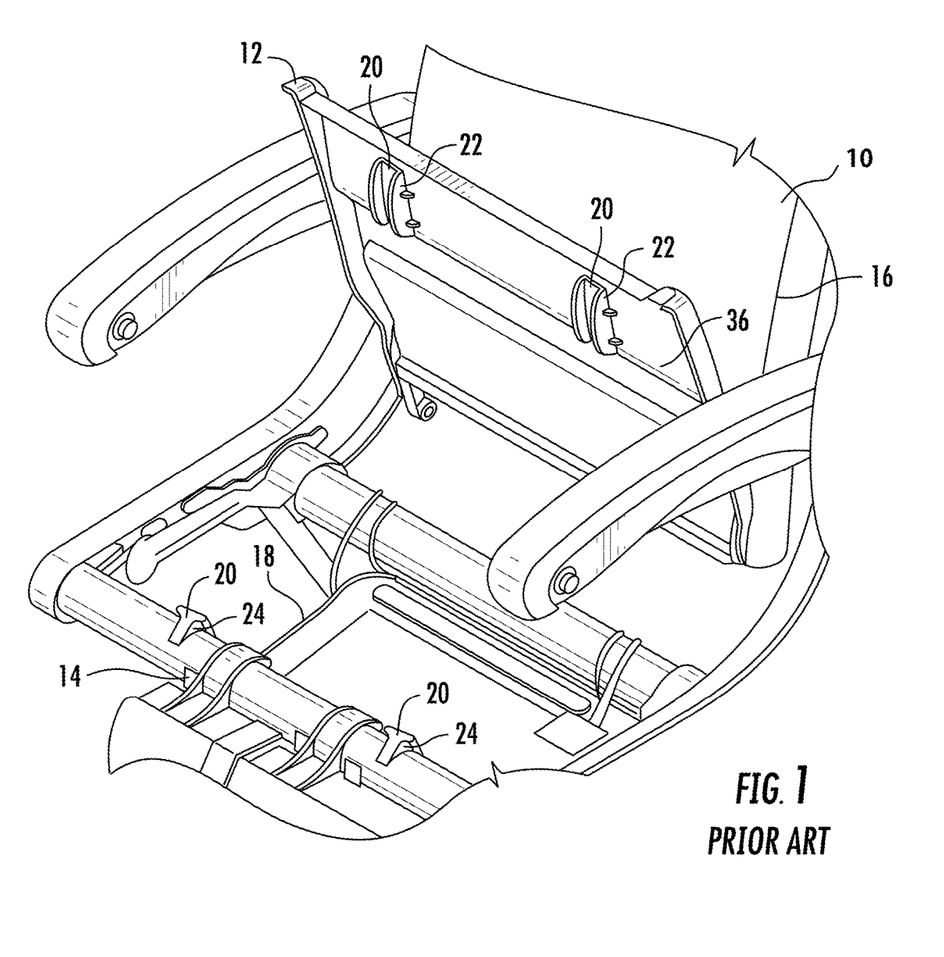
FIG. 1 is a front perspective view of a conventional passenger seat with a pivotable seat pan that is releasably coupled to a seat frame via a coupling device.
Figure 2:
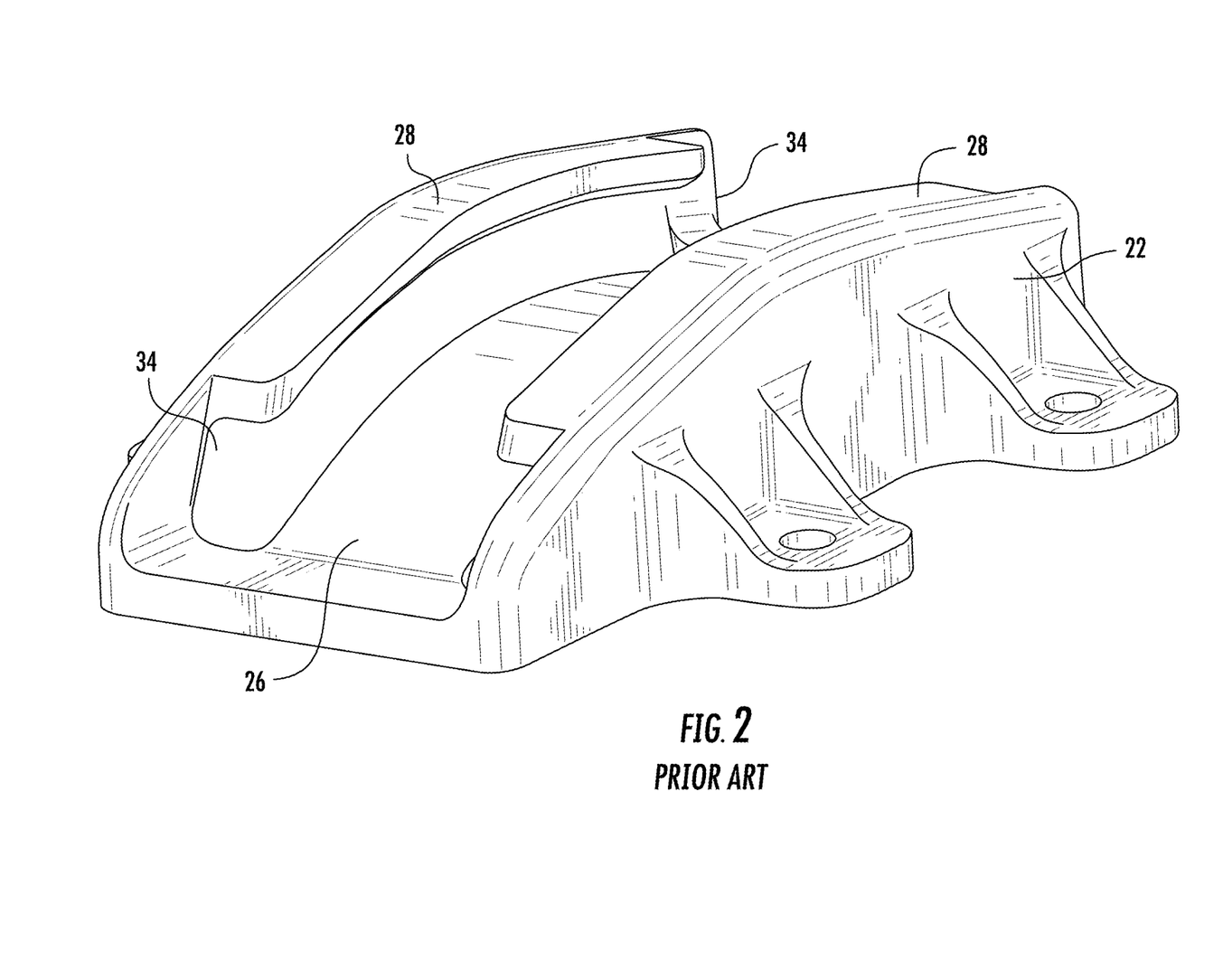
FIG. 2 is a perspective view of a conventional ramp used with the coupling device of FIG. 1.

U.S. Pat. No. 7,926,873 describes a pivotable seat pan 12, which provides access to the IFE box 18 from above a passenger seat 10. As illustrated in FIG. 1, the seat pan 12 is releasably coupled to a seat frame 14 via one or more coupling devices 20 comprising a ramp 22 mounted on a lower surface 36 of the seat pan 14 and a T-shaped projection 24 mounted on the seat frame 14. The ramp 22 comprises a track 26 that is partially enclosed along its length by a pair of lips 28. The ramp 22 has a length that corresponds to the distance traveled by the seat pan 12 when the passenger seat 10 rotates between reclined and upright positions. The projection 24 is inserted through at least one open end 34 of the ramp 22, wherein the pair of lips 28 slidingly lock the projection 24 to the ramp 22 during normal passenger use. As illustrated in FIG. 2, both ends 34 of the ramp 22 may be open, which allows the projection 24 to slide out of the ramp 22 when the seat pan 12 is positioned further forward or aft relative to the most forward or aft location of the seat pan 12 during normal passenger use. For example, in some instances, a technician may rotate the seat back 16 into a position that is more forward than the fully upright position available to a passenger during normal use, which causes the seat pan 12 to travel farther aft than the fully upright position. The projection 24 then slides out of the forward open end 34 of the ramp 22, thereby releasing the seat pan 12 so that it may be rotated upward to provide access to the area below.

While the coupling device described above provides a suitable solution for accessing the IFE box 18, there are certain instances where the coupling between the seat pan 12 and seat frame 14 may inadvertently disengage. For example, during a crash or Head Injury Criterion ("HIC") testing (which is a measure of the likelihood of head injury resulting from an impact), a force may applied to the passenger seat back 16 that pushes the passenger seat back 16 more forward than the fully upright position, resulting in an inadvertent disengagement of the projection 24 from the ramp 22.

Figure 3:
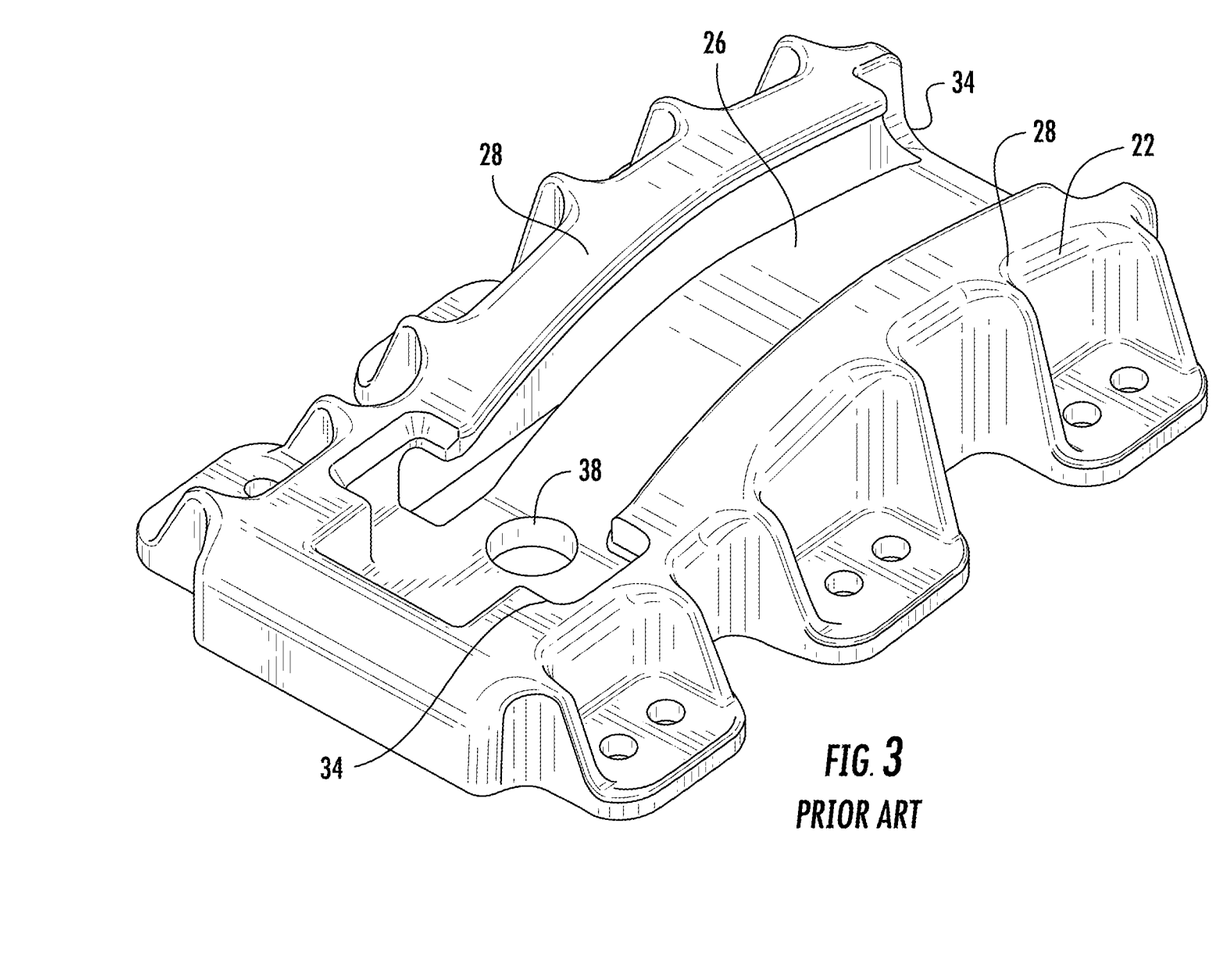
FIG. 3 is a perspective view of a conventional ramp used with the coupling device of FIG. 1, which includes an aperture for insertion of a pin.

Various solutions have been attempted to avoid occurrences of inadvertent disengagement. For example, as shown in FIG. 3, an aperture 38 is formed in the ramp 22 in a location such that when a pin is inserted through the aperture 38, the T-shaped projection 24 is prevented from sliding through the forward open end 34 of the ramp 22. However, because the pin is inserted from above the seat pan 12, the pin is in contact with the seat cushion, which damages the seat cushion over time.

Figure 4:
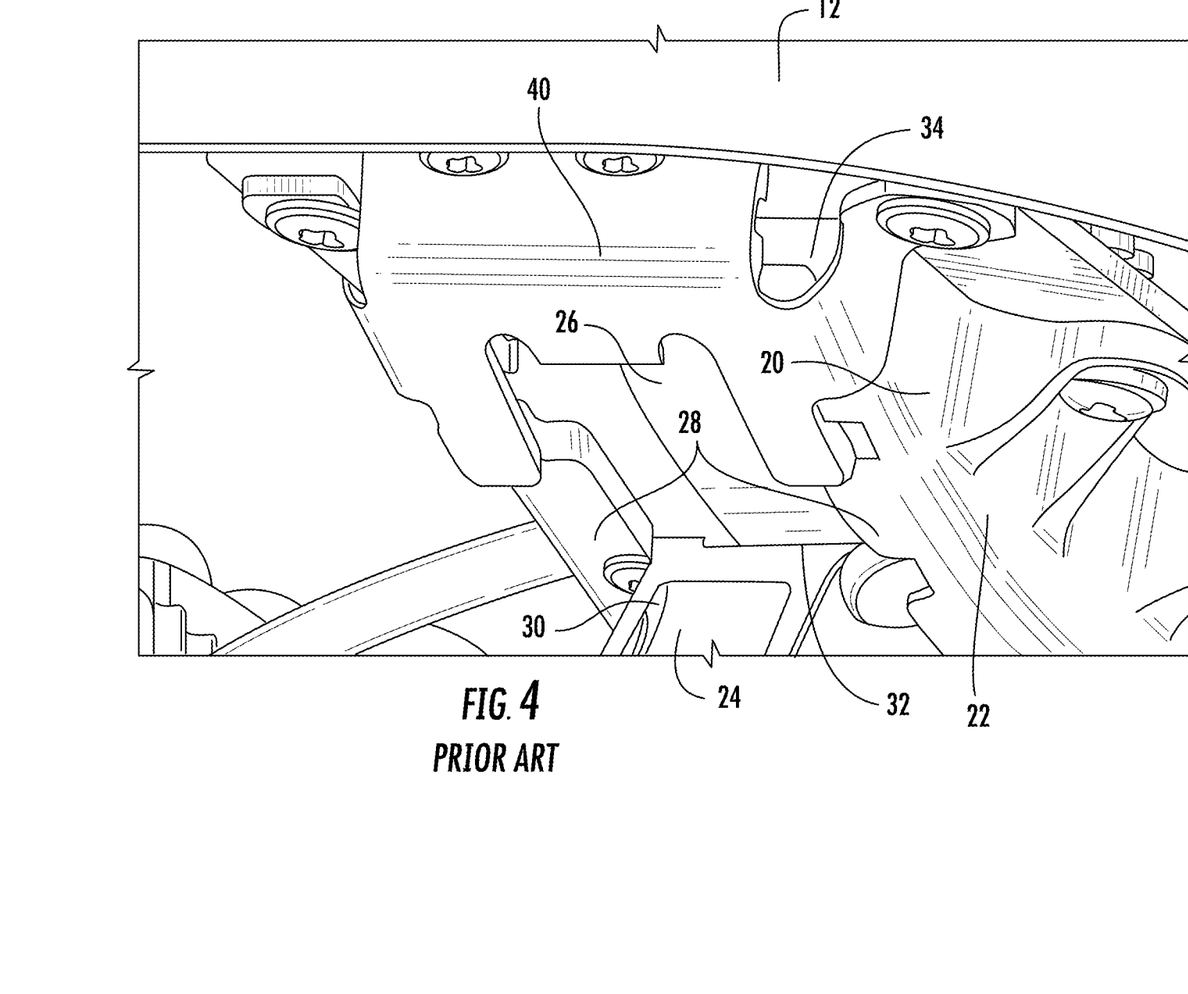
FIG. 4 is a perspective view of a coupling device of FIG. 1, which includes a sheet metal shroud.

In other cases, as illustrated in FIG. 4, a sheet metal shroud 40 is positioned over the forward open end 34 of the ramp 22, which also prevents the projection 24 from sliding through the forward open end 34 of the ramp 22. However, the coupling design of the shroud 40 to the ramp 22 is cumbersome and time-consuming for the technician to engage or disengage the ramp 22 from the projection 24 to perform maintenance.

As a result, it is desirable to provide a latch that is configured to prevent inadvertent disengagement of the projection from the ramp, while also having a simple and quick locking design that requires no special tools to lock/unlock and that does not damage other seat components.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

Embodiments of the present invention include a passenger seat comprising a seat pan and a seat frame, wherein the seat pan is releasably coupled to the seat frame via at least one coupling device. The passenger seat may further comprise a seat back, wherein an aft end of the seat pan is pivotally coupled to the seat back and a forward end of the seat pan is releasably coupled to the seat frame via at least one coupling device.

In certain embodiments, the at least one coupling device comprises a ramp mounted on a lower surface of the seat pan, wherein the ramp comprises at least one open end, and a latch pivotally coupled to the at least one open end of the ramp. The ramp may be formed of injection molded plastic, polycarbonate resin containing glass fiber, and polytetrafluorethylene.

The latch may comprise a flap configured to substantially cover the at least one open end of the ramp when the latch is in a closed position, and a handle configured to extend at least partially through an aperture within the seat pan, wherein the handle is configured to be positioned proximate an edge of the aperture when the latch is in the closed position. The handle may be configured not to extend past an upper surface of the seat pan and/or may be accessible from the upper surface of the seat pan.

The at least one coupling device may further comprise a spring configured to position the latch in the closed position until a force is applied to the handle to rotate the latch to an open position. The spring may be configured so that a minimal force is required to position the latch in the open position.

In some embodiments, the at least one coupling device may comprise a projection mounted on the seat frame. At least a portion of the projection may be inserted through the at least one open end of the ramp so that the projection is releasably and slidingly engaged with the ramp. In certain embodiments, the projection is slidingly engaged with the ramp when the passenger seat back is positioned between a fully reclined position and a fully upright position. In some embodiments, the closed position of the latch is configured to prevent the projection from disengaging from the ramp through the at least one open end. In certain embodiments, latch is configured to prevent the projection from disengaging from the ramp through the at least one open end when the passenger seat back is positioned forward of the fully upright position.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

The described embodiments of the invention provide coupling devices for passenger seats. While the coupling devices are discussed for use with aircraft seats, they are by no means so limited. Rather, embodiments of the coupling devices may be used in passenger seats or other seats of any type or otherwise as desired.

According to certain embodiments of the present invention, as shown in FIGS. 5-9, a passenger seat 10 may include the seat pan 12, the seat frame 14, the seat back 16, and at least one coupling device 20. As illustrated in FIG. 1, in certain embodiments, an aft end of the seat pan 12 is pivotally coupled to the seat back 16, and a forward end of the seat pan 12 is releasably coupled to the seat frame 14 via one or more of the coupling devices 20. The seat pan 12 is configured to slide forward and aft relative to the seat frame 14 when the passenger seat back 16 is rotated between a fully reclined position (aft-most rotational position of the seat back 16) and a fully upright position (forward-most rotational position of the seat back 16) that may be achieved during ordinary passenger use of the passenger seat 10. The amount of angular distance between the fully reclined and fully upright positions may vary depending on the amount of space available between passenger seats 10, the design of the passenger seat 10, or other considerations.

As shown in FIGS. 5-8, the coupling device 20 comprises the ramp 22, and the projection 24 that is releasably engaged by the ramp 22. The ramp 22 is mounted on a lower surface 36 of the seat pan 12, and the projection 24 is mounted on the seat frame 14.

As described above, the ramp 22 comprises the track 26 that is partially enclosed along its length by the pair of lips 28. While certain embodiments of the projection 24 may have a T-shape, the projection 24 generally comprises a body 30 that is configured to have a thickness that is less than the distance between the lips 28 so that the body 30 may fit into the space between the lips 28. A head 32 is positioned proximate an end of the body 30. The head 32 is configured to have a thickness that is less than the width of the track 26, but wider than the distance between the lips 28 so that the lips 28 will retain the head 32 in a location proximate the track 26 as the seat pan 12 translates between the fully upright position and the fully reclined position, as described above. Any suitable shape of the projection 24 may be used, including but not limited to a "T," "I," "H," hour-glass, triangular, inverted elliptical, or other shape that has a tapering quality that allows the lips 28 to retain the head 32 in a location proximate the track 26 while allowing the body 30 to pass through the space between the lips 28.

As described above, the ramp 22 may have a length that corresponds to and/or exceeds the distance traveled by the seat pan 12 when the passenger seat back 16 rotates between the fully upright position and the fully reclined position, as described above. The shape of the ramp 22 is configured to guide the front end of the seat pan 12 to the proper position relative to the reclined position of the passenger seat back 16.

In certain embodiments, the ramp 22 may be formed of injection molded plastic, polycarbonate resin containing glass fiber, and polytetrafluoroethylene ("PTFE"). In other embodiments, the ramp 22 and/or the projection 24 may be formed of any suitable high density plastic such as delrin (acetyl resin) or other ultra-high molecular weight ("UHMW") plastics, metal such as aluminum, composite, or other suitable material that provides the desired weight and strength. The material used to form the ramp 22 may be chosen to provide high strength and a low coefficient of friction. The ramp 22 may be machined from a single piece or material or may be formed in multiple pieces that are then assembled to make the ramp 22.

The projection 24 is inserted through the one or more open ends 34 of the ramp 22, wherein the pair of lips 28 slidingly lock the projection 24 to the ramp 22 as the seat pan 12 translates between the fully upright position and the fully reclined position, as described above. As illustrated in FIG. 2, both ends 34 of the ramp 22 may be open, which allows the projection 24 to slide out of the ramp 22 when the seat pan 12 is pulled to a position that is forward of the fully reclined position (by pushing the passenger seat back 16 aft past the fully reclined position) or when the seat pan 12 is pulled to a position that is aft of the fully upright position (by pushing the passenger seat back 16 forward of the fully upright position). To maneuver the passenger back 16 into these positions that are outside the range of ordinary passenger use of the passenger seat 10, a technician may have to unlock the passenger seat back 16 from the pre-determined range of movement described above. When the projection 24 slides out of either open end 34 of the ramp 22, the seat pan 12 is no longer slidingly coupled to the seat frame 14 so that it may be rotated upward to provide access to the area below.

In order to ensure that the projection 24 does not inadvertently disengage from the ramp 22 through at least the forward open end 34 of the ramp 22 via a force applied to the passenger seat back 16 (such as the force from a crash and/or HIC safety testing), a latch 42 may be coupled to the ramp 22 adjacent the forward open end 34. In certain embodiments, it may be desirable to include a similar latch 42 adjacent the aft open end 34. The open end 34 may include a pair of apertures that are configured to accept a shaft 54 on which the latch 42 is pivotally mounted.

In certain embodiments, the latch 42 may be formed of injection molded nylon 6/6 plastic, zytel 101L. In other embodiments, the latch 42 may be formed of any suitable metal such as sheet metal, aluminum, or stainless steel with some optional welded gussets to add rigidity if some or all of the bends shown in FIGS. 5-8 are included.

Figure 5:
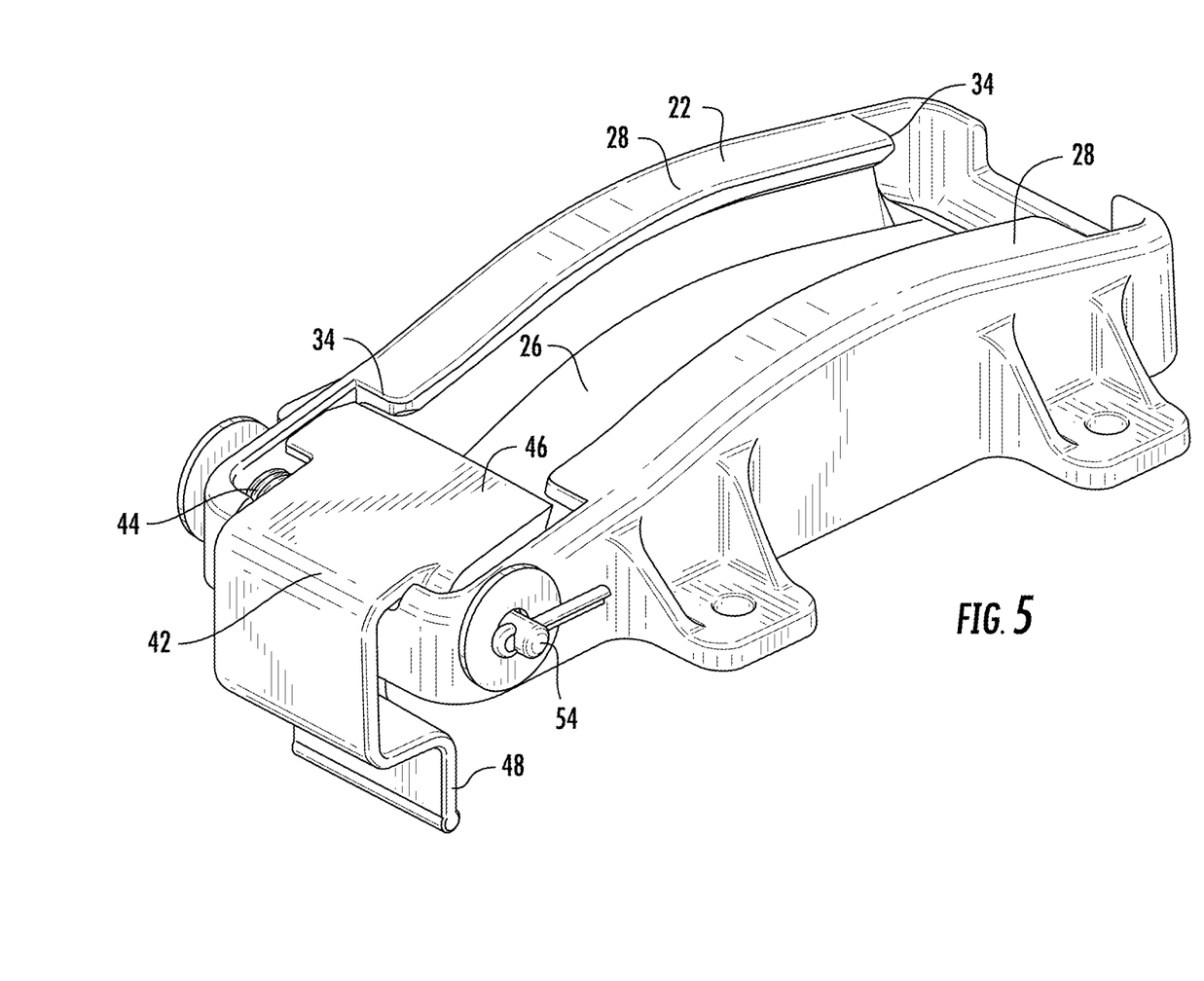
FIG. 5 is a perspective view of a ramp of a coupling device according to certain embodiments of the present invention, for use with the passenger seat of FIG. 1, with a latch in a closed position.
Figure 6:
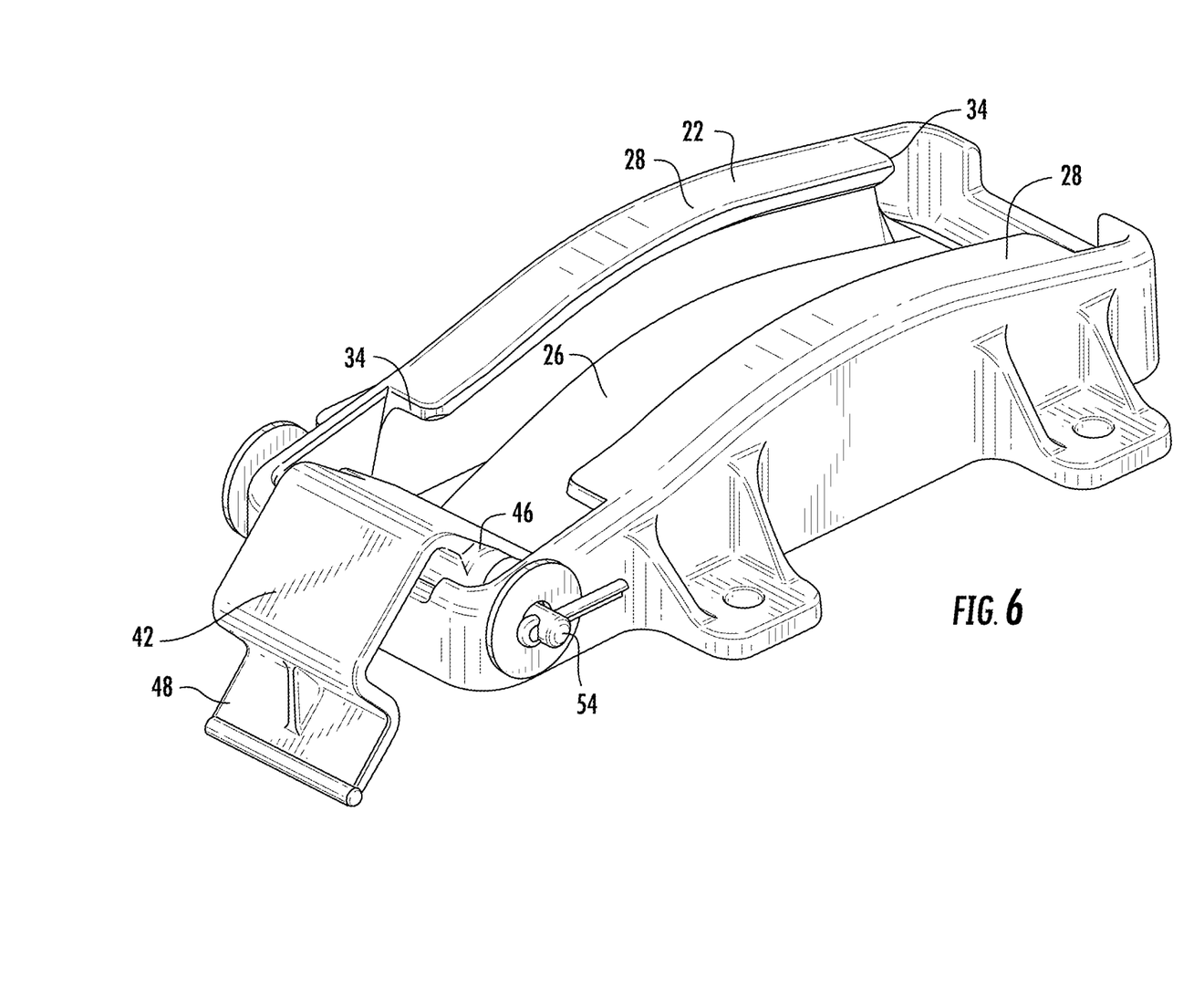
FIG. 6 is a perspective view of the ramp of the coupling device of FIG. 5, with a latch in an open position.
Figure 8:
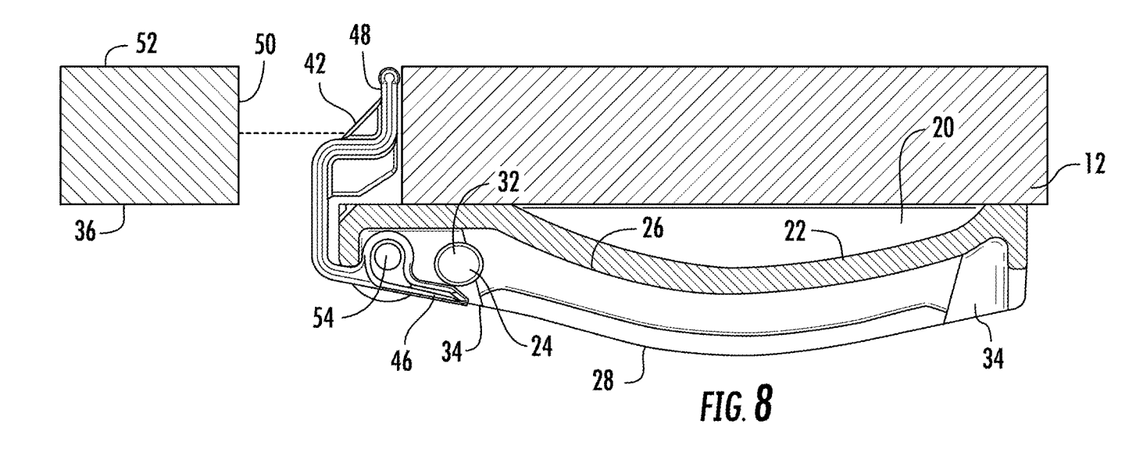
FIG. 8 is a cross-sectional view of the ramp of the coupling device of FIG. 5 installed on a seat pan of the passenger seat of FIG. 1, and coupled to a projection of the coupling device, with a latch in a closed position.

The latch 42 may include a torsion spring 44, which is configured to maintain the latch 42 in a closed position (as shown in FIGS. 5 and 8), wherein a flap 46 of the latch 42 is positioned to substantially cover the open end 34 in the closed position. In the closed position (as best illustrated in FIG. 8), the flap 46 prevents the head 32 of the projection 24 from exiting though the open end 34.

The spring 44 is positioned on and/or proximate the shaft 54. The spring 44 is designed so that a minimal force is required to transition the latch 42 to the open position, while also having sufficient resistance so as to maintain the flap 46 in the closed position until a force is applied to the latch 42 to overcome the spring's resistance. The spring 44 may be formed of metal or plastic materials.

To provide access for a technician to toggle the latch 42 to the open position, the latch 42 further comprises a handle 48, which is configured to extend at least partially through an aperture 50 in the seat pan 12. The handle 48 is configured to have a height that does not extend past an upper surface 52 of the seat pan 12 when the handle 48 is in the closed position (as shown in FIG. 8). As a result, the handle 48 does not project above the seat pan 12 and therefore does not pose a risk of potentially damaging a seat cushion positioned on the seat pan 12.

Figure 7:
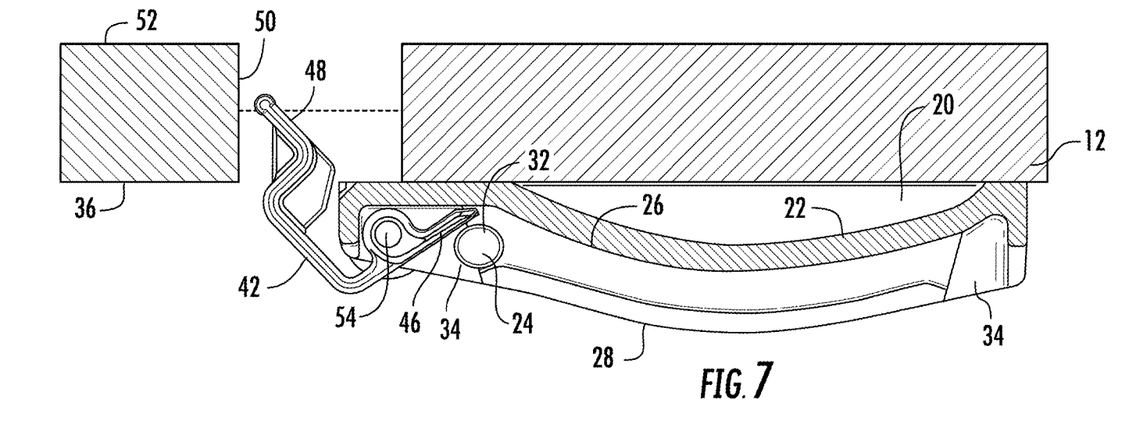
FIG. 7 is a cross-sectional view of the ramp of the coupling device of FIG. 5 installed on a seat pan of the passenger seat of FIG. 1, and coupled to a projection of the coupling device, with a latch in an open position.

The aperture 50 in the seat pan 12 is shaped to allow the handle 48 to rotate between the closed position (as shown in FIG. 8) and the open position (as shown in FIG. 7). As illustrated in FIG. 8, the handle 48 is also configured to contact an edge of the aperture 50 in the closed position to prevent the flap 46 from inadvertently opening when the head 32 of the projection 24 is positioned over and/or proximate the flap 46.

In short, the spring-loaded design of the latch 42 allows a technician to quickly and easily access the handle 48 from the upper surface 52 of the seat pan 12 and toggle the handle 48 to move the latch 42 into the open position without the need for tools to disengage the seat pan 12 from the seat frame 14.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A passenger seat comprising a seat pan and a seat frame, wherein the seat pan is releasably coupled to the seat frame via at least one coupling device, the at least one coupling device comprising:
 (a) a ramp mounted on a lower surface of the seat pan, wherein the ramp comprises at least one open end;
 (b) a latch pivotally coupled to the at least one open end of the ramp, wherein the latch comprises:
  (i) a flap configured to substantially cover the at least one open end of the ramp when the latch is in a closed position;
  (ii) a handle configured to extend at least partially through an aperture within the seat pan, wherein the handle is configured to be positioned proximate an edge of the aperture when the latch is in the closed position; and (c) a spring configured to position the latch in the closed position until a force is applied to the handle to rotate the latch to an open position.

2. The passenger seat of claim 1, wherein the spring is configured so that a minimal force is required to position the latch in the open position.

3. The passenger seat of claim 1, wherein the handle is configured not to extend past an upper surface of the seat pan.

4. The passenger seat of claim 1, further comprising a projection mounted on the seat frame, wherein at least a portion of the projection is inserted through the at least one open end of the ramp so that the projection is releasably and slidingly engaged with the ramp.

5. The passenger seat of claim 4, wherein the closed position of the latch is configured to prevent the projection from disengaging from the ramp through the at least one open end.

6. The passenger seat of claim 1, wherein the handle is accessible from an upper surface of the seat pan.

7. A passenger seat comprising a seat pan, a seat back, and a seat frame, wherein an aft end of the seat pan is pivotally coupled to the seat back and a forward end of the seat pan is releasably coupled to the seat frame via at least one coupling device, the at least one coupling device comprising:

(a) a ramp and a projection, wherein the ramp is mounted on a lower surface of the seat pan and the projection is mounted on the seat frame, wherein the ramp comprises at least one open end through which at least a portion of the projection is inserted so that the projection is releasably and slidingly engaged with the ramp; and (b) a latch pivotally coupled to the at least one open end of the ramp, wherein the latch comprises a flap configured to substantially cover the at least one open end of the ramp when the latch is in a closed position.

8. The passenger seat of claim 7, wherein the latch further comprises a handle configured to extend at least partially through an aperture within the seat pan.

9. The passenger seat of claim 8, wherein the handle is accessible from an upper surface of the seat pan.

10. The passenger seat of claim 8, further comprising a spring configured to position the latch in the closed position until a force is applied to the handle to rotate the latch to an open position.

11. The passenger seat of claim 10, wherein the spring is configured so that a minimal force is required to position the latch in the open position.

12. The passenger seat of claim 8, wherein the handle is configured not to extend past an upper surface of the seat pan.

13. The passenger seat of claim 7, wherein the closed position of the latch is configured to prevent the projection from disengaging from the ramp through the at least one open end.

14. The passenger seat of claim 7, wherein the ramp is formed of injection molded plastic, polycarbonate resin containing glass fiber, and polytetrafluorethylene.

15. A passenger seat comprising a seat pan, a seat back, and a seat frame, wherein an aft end of the seat pan is pivotally coupled to the seat back and a forward end of the seat pan is releasably coupled to the seat frame via at least one coupling device, the at least one coupling device comprising:

(a) a ramp and a projection, wherein the ramp is mounted on a lower surface of the seat pan and the projection is mounted on the seat frame, wherein the ramp comprises at least one open end through which at least a portion of the projection is inserted so that the projection is slidingly engaged with the ramp when the passenger seat back is positioned between a fully reclined position and a fully upright position; and (b) a latch pivotally coupled to the at least one open end of the ramp, wherein the latch is configured to prevent the projection from disengaging from the ramp through the at least one open end when the passenger seat back is positioned forward of the fully upright position.

16. The passenger seat of claim 15, wherein the latch comprises a flap configured to substantially cover the at least one open end of the ramp when the latch is in a closed position.

17. The passenger seat of claim 15, wherein the latch comprises a handle configured to extend at least partially through an aperture within the seat pan.

18. The passenger seat of claim 17, wherein the handle is accessible from an upper surface of the seat pan.

19. The passenger seat of claim 18, further comprising a spring configured to position the latch in a closed position until a force is applied to the handle to rotate the latch to an open position.

20. The passenger seat of claim 17, wherein the handle is configured not to extend past an upper surface of the seat pan.

* * * * *